(12) United States Patent
Guo

(10) Patent No.: US 6,813,972 B2
(45) Date of Patent: Nov. 9, 2004

(54) DIFFERENTIAL HOUSING ASSEMBLY WITH CAP-RING BEARING SUPPORT ARCHITECTURE

(75) Inventor: Don F. Guo, Troy, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 33 days.

(21) Appl. No.: 10/213,691

(22) Filed: Aug. 7, 2002

(65) Prior Publication Data

US 2004/0060384 A1 Apr. 1, 2004

(51) Int. Cl.⁷ .................... F16H 48/06; F16C 19/36; F16C 25/00
(52) U.S. Cl. .................. 74/606 R; 475/230; 475/246; 384/583
(58) Field of Search .................. 74/606 R, 409, 74/607, 424; 384/583, 519, 562; 475/230, 222, 246, 220, 231, 235; 180/375, 378

(56) References Cited

U.S. PATENT DOCUMENTS

| | | |
|---|---|---|
| 1,944,612 A | 1/1934 | Repeck |
| 2,016,343 A | 10/1935 | Oberem |
| 2,529,392 A | 11/1950 | Herreshoff |
| 2,561,335 A | 7/1951 | Buckendale |
| 2,563,680 A | 8/1951 | Hoffman |
| 2,651,216 A | 9/1953 | Alden |
| 3,198,036 A | 8/1965 | Müller |
| 3,202,466 A | 8/1965 | Kaptur |
| 3,715,936 A * | 2/1973 | Jones .................... 475/246 |
| 4,543,853 A * | 10/1985 | von Hiddessen et al. ... 475/246 |
| 4,821,602 A | 4/1989 | Yasui et al. |
| 4,893,075 A * | 1/1990 | Dierker, Jr. .............. 324/174 |
| 5,269,731 A | 12/1993 | Scudder et al. ........... 475/230 |
| 5,624,345 A | 4/1997 | Graft et al. .............. 475/230 |
| 6,010,424 A * | 1/2000 | Irwin ..................... 475/231 |
| 6,093,127 A * | 7/2000 | DiDomenico et al. ....... 475/230 |
| 6,227,716 B1 * | 5/2001 | Irwin ..................... 384/583 |
| 6,474,873 B1 | 11/2002 | Krisher et al. ............ 384/563 |
| 6,497,027 B1 * | 12/2002 | Irwin ..................... 29/407.01 |
| 6,618,924 B1 * | 9/2003 | Irwin ..................... 29/407.05 |

FOREIGN PATENT DOCUMENTS

| | | | | |
|---|---|---|---|---|
| GB | 1400802 | * | 7/1975 | ........ 74/606 R |
| GB | 2043256 A | * | 10/1980 | ........ 74/606 R |

* cited by examiner

Primary Examiner—Vinh T. Luong
(74) Attorney, Agent, or Firm—Brinks Hofer Gilson & Lione

(57) ABSTRACT

A differential housing assembly includes a differential housing having a differential case supported therein. The differential housing includes a first support structure and a second support structure. The differential case includes a pair of extending neck portions. The first support structure includes a pedestal and a bearing cap, wherein a first of the extending neck portions is received by the pedestal and the bearing cap is attached to the pedestal whereby the first extending neck portion is secured radially between the pedestal and the bearing cap. The second support structure includes a bearing bore having a snap ring groove and a snap ring, wherein a second of the neck portions is received within the bearing bore and the snap ring is positioned within the snap ring groove to provide axial support for the differential case within the differential housing.

8 Claims, 3 Drawing Sheets

DIFFERENTIAL HOUSING ASSEMBLY WITH CAP-RING BEARING SUPPORT ARCHITECTURE

TECHNICAL FIELD

The present invention generally relates to a differential housing having a differential case supported therein. More specifically, the present invention is related to a specific support structure within the differential housing and a method of assembling the differential case to the differential housing.

BACKGROUND

In a typical automotive rear axle, a differential case is supported within a differential housing. Differential gears interconnect a prop shaft of the vehicle to a transmission of the vehicle. The differential gears further connect axle shafts which extend from the differential housing to the rear wheels. Thus, power is transferred from the transmission, through the drive shaft, through the differential case, and to the wheels of the vehicle.

One type of known differential housing includes a pair of pedestal structures formed therein which are adapted to support the differential case within the differential housing. The differential case typically includes two extending neck portions which are received by the pedestals and bearing caps are bolted or otherwise attached to the pedestals to secure the neck potions of the differential case therein. This method involves the use of two bearing caps and bolts which adds weight and size to the differential housing. Alternatively, some differential housings include two bearing bores, and the differential case is placed within the bearing bores. Once the differential case is placed within the bearing bores, snap rings are placed in each of the bearing bores to provide axial support for the differential case. Although this allows the differential housing to be narrower and lighter than other designs, the assembly process is difficult, and requires a longer differential housing.

Therefore, there is a need for a differential housing having a differential case mounted therein in such a way as to reduce the size and weight of the differential housing assembly while maintaining relative ease of assembly.

DETAILED DESCRIPTION OF THE PREFERRED EMBODIMENTS

The following description of the preferred embodiments of the invention is not intended to limit the scope of the invention to these preferred embodiments, but rather to enable any person skilled in the art to make and use the invention.

Figure 1:
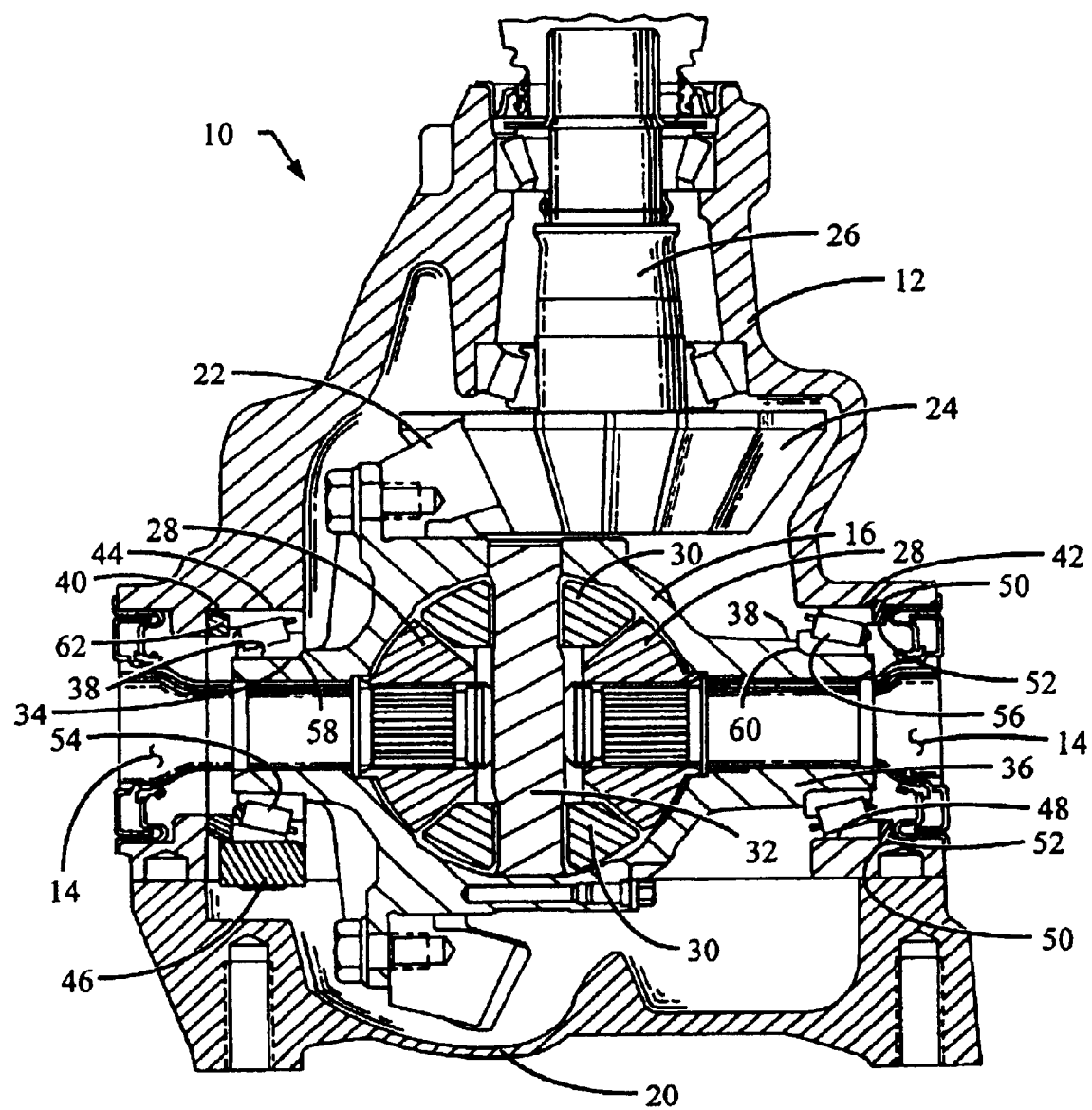
FIG. 1 is a sectional view of a differential housing assembly of the present invention.
Figure 2:
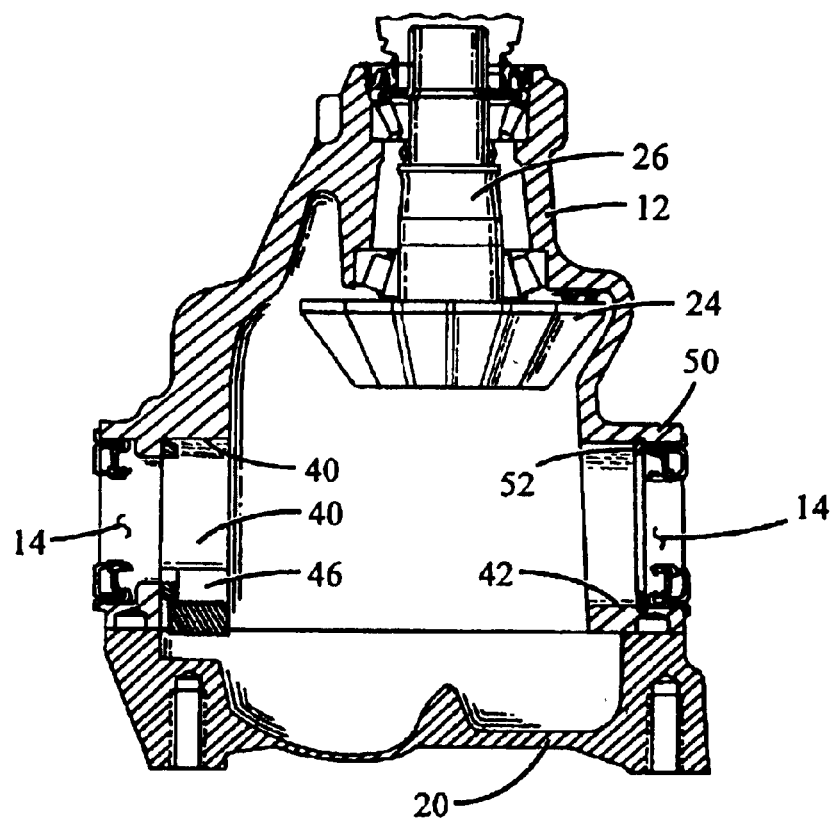
FIG. 2 is a sectional view similar to FIG. 1 wherein the differential case is removed.
Figure 4:
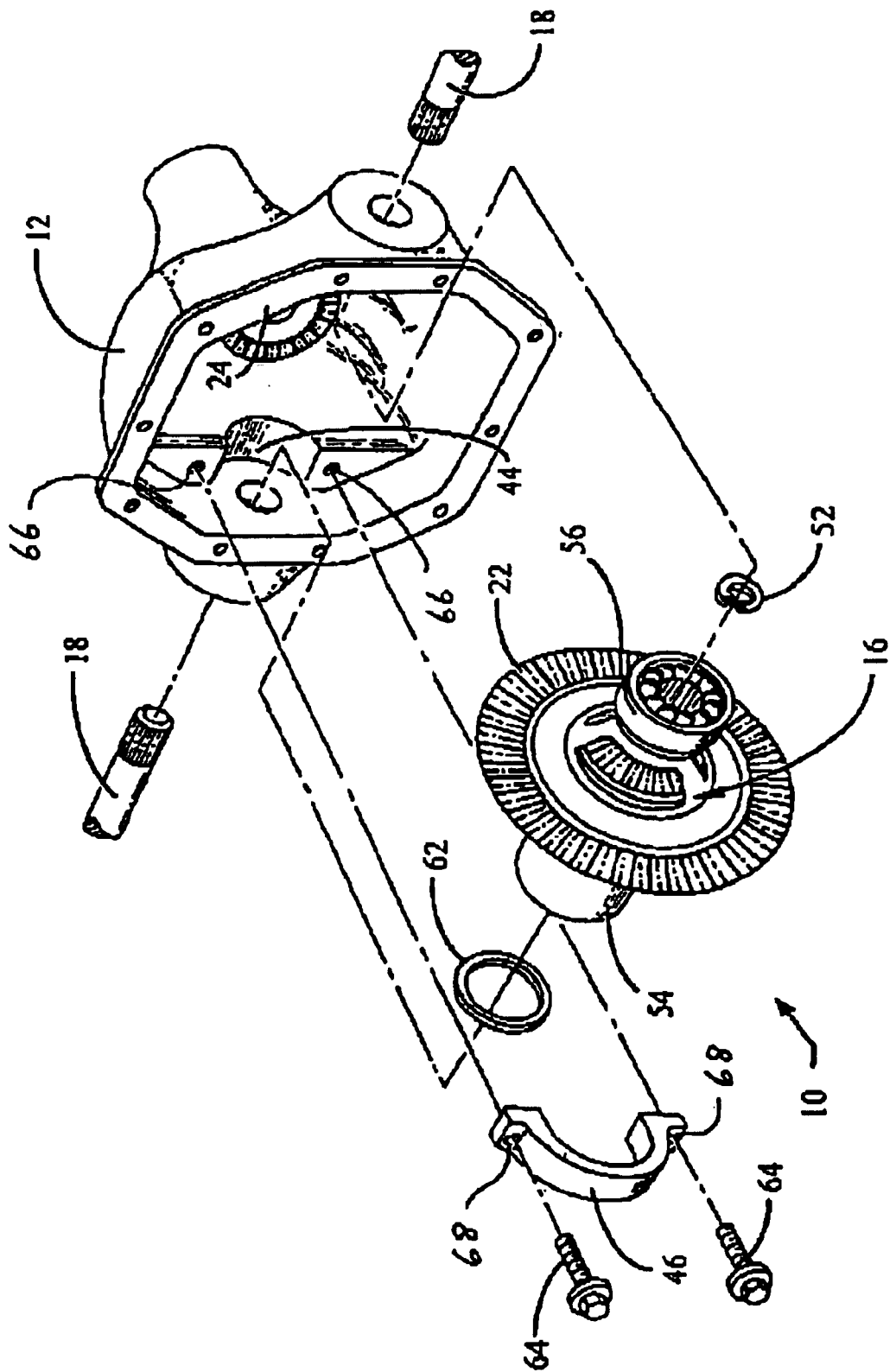
FIG. 4 is an exploded view of the differential housing assembly.

Referring to FIGS. 1, 2, and 4, a differential housing assembly is shown generally at 10. The differential housing assembly 10 includes a housing 12 which includes a pair of openings 14 extending to either side of the housing 12. A differential case 16 is supported by a pair of structural supports 40, 42 within the housing 12. The differential housing assembly 10 is adapted to transfer driving torque from a drive shaft (not shown) of a vehicle to axle half shafts 18 of the vehicle. The differential case 16 is mounted between the openings 14 within the differential housing 12 such that axle half shafts 18 (shown in FIG. 4) of the vehicle can extend into the openings 14 to engage the differential case 16. Thus, driving torque is transferred from the drive shaft through the differential case 16 and to the axle half-shafts 18. A cover 20 is mounted to the differential housing 12 to enclose the differential case 16 and to contain lubricant therein.

Figure 3:
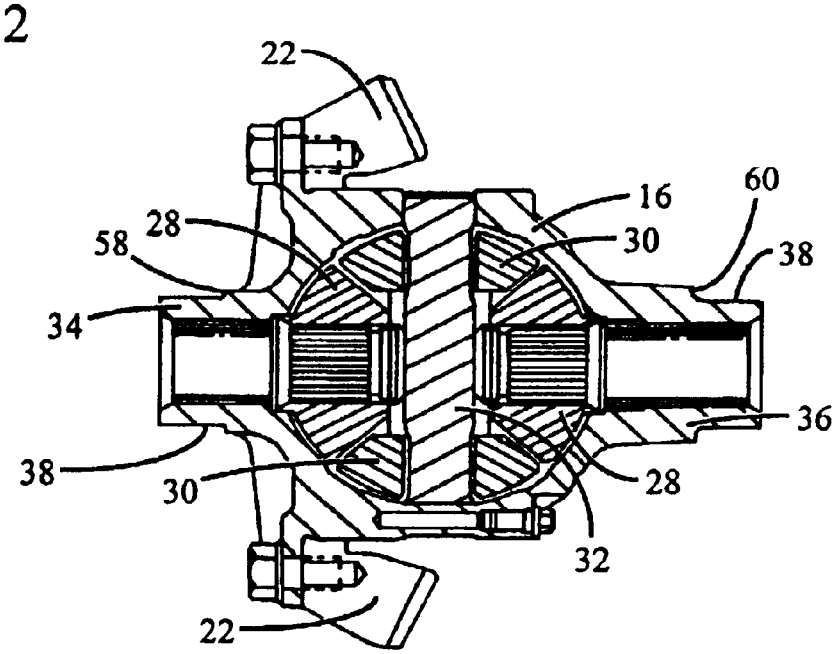
FIG. 3 is a sectional view of the differential case.

Referring to FIGS. 1 and 3, the differential case 16 preferably includes a gear set supported within the differential case 16. The gear set allows rotational movement to be transferred from the differential case 16 to the axle half shafts 18 while allowing the axle half shafts 18 to rotate relative to one another. A hypoid ring gear 22 is mounted externally to the differential case 16. The hypoid ring gear 22 is generally annularly shaped having a plurality of circumferentially spaced teeth extending angularly from a side face of the hypoid ring gear 22. The teeth are adapted to provide smooth engagement with corresponding teeth on a hypoid pinion gear 24. Thus driving torque is transferred from the drive shaft of the vehicle to the hypoid pinion gear 24 to the hypoid ring gear 22, and through the hypoid ring gear 22 to the differential case 16.

The differential gear set generally includes a pair of side gears 28 that are substantially axially aligned with and spaced apart from each other, while being supported within the differential case 16. Each of the side gears 28 is attached to an end of one axle half-shaft 18 of the vehicle. The distal ends of the axle half-shafts 18 are individually connected to a wheel (not shown) of the vehicle. A pair of pinion gears 30, which are substantially axially aligned with and spaced apart from one other, are supported within the differential case 16. Each of the pinion gears 30 engages the side gears 28. The pinion gears 30 are rotatably mounted on a pinion pin 32 that is supported so as to rotate with the differential case 16.

The differential case 16 includes a pair of extending neck portions 34, 36. The inner surface of each of the extending neck portions 34, 36 is adapted to rotatably support a proximal end of one of the axle half-shafts 18. The external surface 38 of each of the extending neck portions 34, 36 is adapted to rotatably support the differential case 16 within the differential housing 12.

Referring to FIGS. 1, 2 and 4, the first support structure 40 and the second support structure 42 support the extending neck portions 34, 36 of the differential case 16. The first support structure 40 includes a pedestal 44 and a bearing cap 46 such that a first of the two extending neck portions 34 is received by the pedestal 44. The bearing cap 46 is attached to the pedestal 44 and secures the first extending neck portion 34 thereto.

The second support structure 42 includes a bearing bore 48 having a snap ring groove 50 and a snap ring 52. A second of the extending neck portions 36 is received within the bearing bore 48. The snap ring 52 is positioned within the snap ring groove 50 to provide axial support for the differential case 16 within the differential housing 12.

Each of the first and second extending neck portions 34, 36 are supported within the first and second support structures 40, 42 by one of a pair of bearings 54, 56. The inner races of the bearings 54, 56 are secured to the outer surfaces 38 of the first and second extending neck portions 34, 36.

The bearings 54, 56 can be secured to the extending neck portions 34, 36 by press fitting or any other suitable method. Preferably, each of the first and second extending neck portions 34, 36 includes a bearing shoulder 58, 60 to provide a support for the bearings 54, 56. As shown, the bearings 54, 56 are tapered roller bearings, but any suitable bearing could be used.

At the time of assembly, one of the bearings 54 is placed to the first extending neck portion 34. After the bearing 54 is placed to the first extending neck portion 34 of the differential case 16, the differential case assembly 16 is placed within the differential housing 12. First, the second extending neck portion 36 is inserted within the bearing bore 48 of the second support structure 42. The differential case 16 is slid toward the second support structure 42 as far as possible. Then, the first extending neck portion 34 is moved toward the pedestal 44 of the first support structure 40, until the bearing 54 contacts the pedestal 44.

After the differential case assembly 16 is placed within the differential housing, a bearing 56 is pressed into the bearing bore 48 about the second extending neck portion 36. Once the bearing 56 is in place, the snap ring 52 is placed within the snap ring groove 50 in order to provide axial support.

After the bearing 56 and the snap ring 52 are placed within the bearing bore 48, a solid shim 62 is placed within the first support structure 40 to position the differential case 16 within the differential housing 12. The solid shim 62 has a thickness such that the solid shim 62 positions the differential case 16 within the differential housing 12 so the hypoid ring gear 22 properly engages the gear 24 of the prop shaft 26. The thickness of the solid shim 62 is determined at the time of assembly. At the time of assembly, after the differential case assembly 56 has been placed within the differential housing 12, measurements are taken to calculate the required thickness of the solid shim 62 and the snap ring 52.

After the differential case 16 is placed within the differential housing 12, the appropriate size can be determined and accordingly a solid shim 62 and a snap ring 52 of the appropriate thickness can be selected. As stated above, the thickness of the solid shim 62 is selected to insure proper engagement of the hypoid ring gear 22 with the gear 24 on the prop shaft 26. The differential case 16 can be spaced such that the hypoid ring gear 22 and the gear 24 on the prop shaft 26 just engage, or alternatively, the thickness can be selected such that there is a pre-load placed upon the hypoid ring gear 22 and the gear 24 of the prop shaft 26. A pre-load is sometimes desirable to reduce backlash and noise between the gears 22, 24.

The solid shim 62 is placed within the housing after the snap ring 52 is placed within the snap ring groove 50 of the bearing bore 48. Once the proper thickness is determined and the solid shim 62 and snap ring 52 are selected, the bearing is placed within the bearing bore 48, the snap ring 52 is placed within the snap ring groove 50 of the bearing bore 48, and the solid shim is placed between the first support structure 40 and the differential case 16. The thickness of the solid shim 62 is such that once the solid shim 62 is placed the solid shim 62 will keep the differential case 16 held securely against the snap ring 52, thereby maintaining the proper positioning of the differential case 16 within the differential housing 12.

After the differential case 16 is positioned within the differential housing 12 and the solid shim 62 and snap ring 52 are in place, the bearing cap 46 is attached to the pedestal 44 to secure the first extending neck portion 34 of the differential case 16 to the pedestal 44. Preferably, the pedestal 44 includes a pair of threaded bores 66 and the bearing cap 46 includes a pair of through bores 68. The bearing cap 46 is secured to the pedestal 44 by inserting a threaded fastener 64 through each of the through bores 68 and threading each of the threaded fasteners 64 into one of the threaded bores 66, thereby securing the bearing cap 46 to the pedestal 44.

By incorporating one pedestal type support and one snap ring type support into the differential housing 12, the assembly 10 is not as large and heavy as one having a pair of pedestal structures, but not as difficult to assemble as a differential housing assembly 10 having two snap rings.

The foregoing discussion discloses and describes the preferred embodiment. One skilled in the art will readily recognize from such discussion, and from the accompanying drawings and claims, that changes and modifications can be made to the preferred embodiment without departing from the true spirit and fair scope of the inventive concepts as defined in the following claims. The preferred embodiment has been described in an illustrative manner, and it is to be understood that the terminology which has been used is intended to be in the nature of words of description rather than of limitation.

What is claimed is:

1. A differential housing assembly comprising:
   a differential case having a pair of extending neck portions;
   a differential housing including a first support structure and a second support structure adapted to support said differential case within said differential housing;
   said first support structure including a pedestal and a bearing cap, said pedestal including a pair of threaded bores and said bearing cap including a pair of through bores, wherein a first of said extending neck portions is received by said pedestal and said bearing cap is attached to said pedestal by a pair of threaded fasteners extending through each of said through bores and threading into said threaded bores whereby said first extending neck portions is secured radially between said pedestal and said bearing cap;
   said second support structure including a bearing bore having a snap ring groove and a snap ring, wherein a second of said neck portions is received within said bearing bore and said snap ring is positioned within said snap ring groove to provide axial support for said differential case within said differential housing.

2. The differential housing assembly of claim 1 further including a solid shim positioned adjacent said first extending neck portion of said differential case, said solid shim having a thickness such that said solid shim positions said differential case within said differential housing and said snap ring has a thickness such that said snap ring secures amid differential case against said solid shim.

3. The differential housing assembly of claim 1 further including a pair of bearings, one of said bearings being mounted to each of said extending neck portions such that said differential case is rotatably supported by said first and second support structures.

4. The differential housing assembly of claim 3 wherein said bearings are tapered roller bearings.

5. The differential housing assembly of claim 3 wherein each of said first and second neck portions of said differential case includes a bearing shoulder, said bearings being supported on said first and second neck portions by said bearing shoulders.

6. The differential housing assembly of claim 1 wherein said differential housing further includes a cover adapted to seal said differential housing with said differential case secured within said differential housing.

7. The differential housing assembly of claim 1 wherein said differential case includes a gear set supported within said differential case and a hypoid ring gear mounted externally to said differential case.

8. The differential housing assembly of claim 7 wherein said gear set includes:

a pair of side gears substantially axially aligned and spaced apart from each other, each of said side gears being supported by said differential case and adapted to engage an axle half-shaft;

a pair of pinion gears substantially axially aligned and spaced apart from each other, each of said pinion gears engaging said side gears; and a pinion pin secured to and extending diametrically across said differential case, said pinion pin supporting said pinion gears in engagement with said side gears and allowing rotational movement of said pinion gears about said pinion pin.

\* \* \* \* \*

UNITED STATES PATENT AND TRADEMARK OFFICE
CERTIFICATE OF CORRECTION

PATENT NO. : 6,813,972 B2
DATED : November 9, 2004
INVENTOR(S) : Don F. Guo

It is certified that error appears in the above-identified patent and that said Letters Patent is hereby corrected as shown below:

<u>Column 4,</u>
Line 55, before "differential" delete "amid" and substitute -- said -- in its place.

Signed and Sealed this

Seventeenth Day of May, 2005

JON W. DUDAS
*Director of the United States Patent and Trademark Office*